(12) United States Patent
Carney et al.

(10) Patent No.: US 8,541,107 B2
(45) Date of Patent: Sep. 24, 2013

(54) PIGMENTED POLYIMIDE FILMS AND METHODS RELATING THERETO

(75) Inventors: Thomas Edward Carney, Orient, OH (US); Jeffrey Michael Bartolin, Westerville, OH (US); Meredith L Dunbar, Canal, OH (US); Scott John Herrmann, Gahanna, OH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 240 days.

(21) Appl. No.: 12/850,739

(22) Filed: Aug. 5, 2010

(65) Prior Publication Data

US 2011/0039085 A1 Feb. 17, 2011

Related U.S. Application Data

(60) Provisional application No. 61/233,623, filed on Aug. 13, 2009.

(51) Int. Cl.
B32B 27/28 (2006.01)
B32B 5/16 (2006.01)

(52) U.S. Cl.
USPC ......... 428/473.5; 428/331; 428/332; 428/402

(58) Field of Classification Search
USPC .............................. 428/331, 332, 402, 473.5
See application file for complete search history.

(56) References Cited

U.S. PATENT DOCUMENTS

| | | | |
|---|---|---|---|
| 4,677,528 A | 6/1987 | Miniet | |
| 4,778,872 A | 10/1988 | Sasaki et al. | |
| 4,822,718 A * | 4/1989 | Latham et al. | 430/271.1 |
| 5,166,308 A | 11/1992 | Kreuz et al. | |
| 5,302,652 A | 4/1994 | Parish | |
| 5,358,782 A | 10/1994 | Parish | |
| 5,780,201 A * | 7/1998 | Sabnis et al. | 430/270.1 |
| 6,794,031 B2 | 9/2004 | Murakami et al. | |
| 6,908,685 B2 | 6/2005 | Uhara et al. | |
| 7,550,194 B2 | 6/2009 | Simone et al. | |
| 2004/0142191 A1 | 7/2004 | Mei-Yen et al. | |
| 2004/0142831 A1 | 7/2004 | Lezer | |
| 2004/0249019 A1 | 12/2004 | Meyer et al. | |
| 2005/0080228 A1 * | 4/2005 | Silvi et al. | 528/310 |
| 2005/0164022 A1 | 7/2005 | Kliesch et al. | |
| 2007/0025740 A1 | 2/2007 | Katoh et al. | |
| 2007/0158869 A1 | 7/2007 | Yanagida et al. | |
| 2009/0022939 A1 | 1/2009 | Yanagida et al. | |
| 2009/0062505 A1 | 3/2009 | Miyamoto | |

FOREIGN PATENT DOCUMENTS

| | | |
|---|---|---|
| CA | 708896 | 5/1965 |
| EP | 0 441 321 A2 | 8/1991 |
| EP | 0 659 553 A1 | 6/1995 |
| EP | 879839 A1 * | 11/1998 |
| EP | 1 484 361 A1 | 12/2004 |
| EP | 1 732 362 A1 | 12/2006 |
| EP | 2 072 580 A1 | 6/2009 |
| EP | 2 218 754 A1 | 8/2010 |
| GB | 2 176 193 A | 12/1986 |
| JP | 07126585 | 5/1995 |
| WO | WO 2005/061200 A1 | 7/2005 |
| WO | WO 2007/078857 A2 | 7/2007 |
| WO | WO 2008/060302 A1 | 5/2008 |
| WO | PCT/US10/25756 | 3/2010 |

OTHER PUBLICATIONS

HP0182 PCT Search Report.
U.S. Appl. No. 61/158,074, filed Mar. 6, 2009, Carney et al.
U.S. Appl. No. 12/842,174, filed Jul. 23, 2010, Carney et al.
HP0176PCT Search Report.
HP0176PCT1 Search Report.

* cited by examiner

*Primary Examiner* — Callie Shosho
*Assistant Examiner* — John Freeman
(74) *Attorney, Agent, or Firm* — Dickestein Shapiro LLP

(57) ABSTRACT

The present disclosure is directed to a base film having a thickness from 8 to 152 microns, a 60 degree gloss value from 2 to 35, an optical density greater than or equal to 2 and a dielectric strength greater than 1400 V/mil. The base film comprises a chemically converted (partially or wholly aromatic) polyimide in an amount from 63 to 96 weight percent of the base film. The base film further comprises a pigment and a matting agent. The matting agent is present in an amount from 1.6 to 10 weight percent of the base film, has a median particle size from 1.3 to 10 microns, and has a density from 2 to 4.5 g/cc. The pigment is present in an amount from 2 to 35 weight percent of the base film. The present disclosure is also directed to coverlay films comprising the base film in combination with an adhesive layer.

18 Claims, No Drawings

PIGMENTED POLYIMIDE FILMS AND METHODS RELATING THERETO

FIELD OF DISCLOSURE

The present disclosure relates generally to matte finish base films that are useful in coverlay applications and have advantageous dielectric and optical properties. More specifically, the matte finish base films of the present disclosure comprise a relatively low concentration of pigment and matting agent in a polyimide film imidized by a chemical (as opposed to a thermal) conversion process.

BACKGROUND OF THE DISCLOSURE

Broadly speaking, coverlays are known as barrier films for protecting electronic materials, e.g., for protecting flexible printed circuit boards, electronic components, leadframes of integrated circuit packages and the like. A need exists however, for coverlays to be increasingly thin and low in cost, while not only having acceptable electrical properties (e.g., dielectric strength), but also having acceptable structural and optical properties to provide security against unwanted visual inspection and tampering of the electronic components protected by the coverlay.

SUMMARY OF THE INVENTION

The present disclosure is directed to a base film. The base film comprises a chemically converted polyimide in an amount from 63 to 96 weight percent of the base film. The chemically converted polyimide is derived from: i. at least 50 mole percent of an aromatic dianhydride, based upon a total dianhydride content of the polyimide, and ii. at least 50 mole percent of an aromatic diamine based upon a total diamine content of the polyimide. The base film further comprises: a pigment, other than carbon black, present in an amount from 2 to 35 weight percent of the base film; and a matting agent that:
  a. is present in an amount from 1.6 to 10 weight percent of the base film,
  b. has a median particle size from 1.3 to 10 microns, and
  c. has a density from 2 to 4.5 g/cc.
In one embodiment, the base film has: i. a thickness from 8 to 152 microns; ii. a 60 degree gloss value from 2 to 35; iii. an optical density greater than or equal to 2; and iv. a dielectric strength greater than 1400 V/mil. The present disclosure is also directed to coverlay films comprising the base film in combination with an adhesive layer.

DETAILED DESCRIPTION OF THE INVENTION

Definitions

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only to those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

"Dianhydride" as used herein is intended to include precursors or derivatives thereof, which may not technically be a dianhydride but would nevertheless react with a diamine to form a polyamic acid which could in turn be converted into a polyimide.

"Diamine" as used herein is intended to include precursors or derivatives thereof, which may not technically be a diamine but would nevertheless react with a dianhydride to form a polyamic acid which could in turn be converted into a polyimide.

"Polyamic acid" as used herein is intended to include any polyimide precursor material derived from a combination of dianhydride and diamine monomers or functional equivalents thereof and capable of conversion to a polyimide via a chemical conversion process.

"Prepolymer" as used herein is intended to mean a relatively low molecular weight polyamic acid solution which is prepared by using a stoichiometric excess of diamine in order to give a solution viscosity of approximately 50-100 Poise.

"Chemical conversion" or "chemically converted" as used herein denotes the use of a catalyst (accelerator) or dehydrating agent (or both) to convert the polyamic acid to polyimide and is intended to include a partially chemically converted polyimide which is then dried at elevated temperatures to a solids level greater than 98%.

"Finishing solution" herein denotes a dianyhdride in a polar aprotic solvent which is added to a prepolymer solution to increase the molecular weight and viscosity. The dianhydride used is typically the same dianhydride used (or one of the same dianhydrides when more than one is used) to make the prepolymer.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers, unless the context indicates or implies otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

Base Film

The base films of the present disclosure comprise a filled polyimide matrix, where the polyimide is created by a chemical conversion process. One advantage of a chemical conversion process (over a solely thermal conversion process) is that the amount of matting agent necessary to achieve sufficient low gloss is at least 10, 20, 30, 40 or 50 percent less than if a thermal conversion process is used. Generally accepted ranges for 60 degree gloss values are:

| | |
|---|---|
| <10 | flat |
| 10-70 | matte, satin, semi-gloss (various terms are used) |
| >70 | glossy. |

In some embodiments, the base film has a 60 degree gloss value between and optionally including any two of the following: 2, 3, 4, 5, 10, 15, 20, 25, 30 and 35. In some embodiments, the base film has a 60 degree gloss value from 2 to 35. In some embodiments, the base film has a 60 degree gloss value from 10 to 35. The 60 degree gloss value is measured using Micro-TRI-Gloss gloss meter. The lower loading of matting agent (made possible by the chemical conversion) is advantageous, because it: i. lowers overall cost; ii. simplifies the dispersion of matting agent into the polyamic acid (or other polyimide precursor material); and iii. provides the resulting base film with better mechanical properties (e.g., less brittleness). Another advantage of a chemical conversion process (over a thermal conversion process) is that the dielectric strength of the chemically converted base films is higher. In some embodiments, the base film dielectric strength is greater than 1400 V/mil (55 V/micron).

In a chemical conversion process, the polyamic acid solution is either immersed in or mixed with conversion (imidization) chemicals. In one embodiment, the conversion chemicals are tertiary amine catalysts (accelerators) and anhydride dehydrating materials. In one embodiment, the anhydride dehydrating material is acetic anhydride, which is often used in molar excess relative to the amount of amic acid (amide acid) groups in the polyamic acid, typically about 1.2 to 2.4 moles per equivalent of polyamic acid. In one embodiment, a comparable amount of tertiary amine catalyst is used.

Alternatives to acetic anhydride as the anhydride dehydrating material include: i. other aliphatic anhydrides, such as, propionic, butyric, valeric, and mixtures thereof; ii. anhydrides of aromatic monocarboxylic acids; iii. mixtures of aliphatic and aromatic anhydrides; iv. carbodimides; and v. aliphatic ketenes (ketenes may be regarded as anhydrides of carboxylic acids derived from drastic dehydration of the acids).

In one embodiment, the tertiary amine catalysts are pyridine and beta-picoline and are typically used in amounts similar to the moles of anhydride dehydrating material. Lower or higher amounts may be used depending on the desired conversion rate and the catalyst used. Tertiary amines having approximately the same activity as the pyridine, and beta-picoline may also be used. These include alpha picoline; 3,4-lutidine; 3,5-lutidine; 4-methyl pyridine; 4-isopropyl pyridine; N,N-dimethylbenzyl amine; isoquinoline; 4-benzyl pyridine, N,N-dimethyldodecyl amine, triethyl amine, and the like. A variety of other catalysts for imidization are known in the art, such as imidazoles, and may be useful in accordance with the present disclosure.

The conversion chemicals can generally react at about room temperature or above to convert polyamic acid to polyimide. In one embodiment, the chemical conversion reaction occurs at temperatures from 15° C. to 120° C. with the reaction being very rapid at the higher temperatures and relatively slower at the lower temperatures.

In one embodiment, the chemically treated polyamic acid solution can be cast or extruded onto a heated conversion surface or substrate. In one embodiment, the chemically treated polyamic acid solution can be cast on to a belt or drum. The solvent can be evaporated from the solution, and the polyamic acid can be partially chemically converted to polyimide. The resulting solution then takes the form of a polyamic acid-polyimide gel. Alternately, the polyamic acid solution can be extruded into a bath of conversion chemicals consisting of an anhydride component (dehydrating agent), a tertiary amine component (catalyst) or both with or without a diluting solvent. In either case, a gel film is formed and the percent conversion of amic acid groups to imide groups in the gel film depends on contact time and temperature but is usually about 10 to 75 percent complete. For curing to a solids level greater than 98%, the gel film typically must be dried at elevated temperature (from about 200° C., up to about 550° C.), which will tend to drive the imidization to completion. In some embodiments, the use of both a dehydrating agent and a catalyst is preferred for facilitating the formation of a gel film and achieve desired conversion rates.

The gel film tends to be self-supporting in spite of its high solvent content. Typically, the gel film is subsequently dried to remove the water, residual solvent, and remaining conversion chemicals, and in the process the polyamic acid is essentially completely converted to polyimide (i.e., greater than 98% imidized). The drying can be conducted at relatively mild conditions without complete conversion of polyamic acid to polyimide at that time, or the drying and conversion can be conducted at the same time using higher temperatures.

Because the gel has so much liquid that must be removed during the drying and converting steps, the gel generally must be restrained during drying to avoid undesired shrinkage. In continuous production, the base film can be held at the edges, such as in a tenter frame, using tenter clips or pins for restraint.

High temperatures can be used for short times to dry the base film and induce further imidization to convert the gel film to a polyimide base film in the same step. In one embodiment, the base film is heated to a temperature of 200° C. to 550° C. Generally, less heat and time are required for thin films than for thicker films.

During such drying and converting (from polyamic acid to polyimide), the base film can be restrained from undue shrinking and, in fact, may be stretched by as much as 150 percent of its initial dimension. In film manufacture, stretching can be in either the longitudinal direction or the transverse direction or both. If desired, restraint can also be adjusted to permit some limited degree of shrinkage.

Another advantage is the chemically converted base films of the present disclosure are matte on both sides, even if cast onto a smooth surface. If both sides of the base film are matte, any additional layers may be applied to either side of the base film. In contradistinction, when similarly filled polyimide precursor films are solely thermally converted and cast on a smooth surface, the cast side tends to be glossy and the air side tends to be matte.

Yet another advantage is chemically converted base films have higher dielectric strength compared to solely thermally converted base film. Typically, the dielectric strength decreases as the amount of matting agent increases. So while low 60 degree gloss value can be achieved (air side only) in the solely thermal process, by increasing the amount of matting agent, the dielectric strength will decrease.

In one embodiment, the polyamic acids are made by dissolving approximately equimolar amounts of a dianhydride and a diamine in a solvent and agitating the resulting solution under controlled temperature conditions until polymerization of the dianhydride and the diamine is completed.

Typically a slight excess of one of the monomers (usually diamine) is used to initially control the molecular weight and viscosity which can then be increased later via small additional amounts of the deficient monomer. Examples of suitable dianhydrides for use in the polyimides of the present disclosure include aromatic dianhydrides, aliphatic dianhydrides and mixtures thereof. In one embodiment, the aromatic dianhydride is selected from the group consisting of:
- pyromellitic dianhydride;
- 3,3',4,4'-biphenyl tetracarboxylic dianhydride;
- 3,3',4,4'-benzophenone tetracarboxylic dianhydride;
- 4,4'-oxydiphthalic anhydride;
- 3,3',4,4'-diphenyl sulfone tetracarboxylic dianhydride;
- 2,2-bis(3,4-dicarboxyphenyl) hexafluoropropane;
- Bisphenol A dianhydride; and
- mixtures and derivatives thereof.

In another embodiment, the aromatic dianhydride is selected from the group consisting of:
- 2,3,6,7-naphthalene tetracarboxylic dianhydride;
- 1,2,5,6-naphthalene tetracarboxylic dianhydride;
- 2,2',3,3'-biphenyl tetracarboxylic dianhydride;
- 2,2-bis(3,4-dicarboxyphenyl) propane dianhydride;
- bis(3,4-dicarboxyphenyl) sulfone dianhydride;
- 3,4,9,10-perylene tetracarboxylic dianhydride;
- 1,1-bis(2,3-dicarboxyphenyl)ethane dianhydride;
- 1,1-bis(3,4-dicarboxyphenyl)ethane dianhydride;
- bis(2,3-dicarboxyphenyl) methane dianhydride;
- bis(3,4-dicarboxyphenyl) methane dianhydride;
- oxydiphthalic dianhydride;
- bis(3,4-dicarboxyphenyl) sulfone dianhydride;
- mixtures and derivatives thereof.

Examples of aliphatic dianhydrides include:
cyclobutane dianhydride;
[1S*,5R*,6S*]-3-oxabicyclo[3.2.1]octane-2,4-dione-6-spiro-3-(tetrahydrofuran-2,5-dione);
mixtures thereof.

Examples of suitable diamines for use in the polyimides of the present disclosure include aromatic diamines, aliphatic diamines and mixtures thereof. In one embodiment, the aromatic diamine is selected from a group consisting of:
- 3,4'-oxydianiline;
- 1,3-bis-(4-aminophenoxy) benzene;
- 4,4'-oxydianiline;
- 1,4-diaminobenzene;
- 1,3-diaminobenzene;
- 2,2'-bis(trifluoromethyl) benzidene;
- 4,4'-diaminobiphenyl;
- 4,4'-diaminodiphenyl sulfide;
- 9,9'-bis(4-amino)fluorine;
- mixtures and derivatives thereof.

In another embodiment, the aromatic diamine is selected from a group consisting of:
- 4,4'-diaminodiphenyl propane;
- 4,4'-diamino diphenyl methane;
- benzidine;
- 3,3'-dichlorobenzidine;
- 3,3'-diamino diphenyl sulfone;
- 4,4'-diamino diphenyl sulfone;
- 1,5-diamino naphthalene;
- 4,4'-diamino diphenyl diethylsilane;
- 4,4'-diamino diphenysilane;
- 4,4'-diamino diphenyl ethyl phosphine oxide;
- 4,4'-diamino diphenyl N-methyl amine;
- 4,4'-diamino diphenyl N-phenyl amine;
- 1,4-diaminobenzene (p-phenylene diamine);
- 1,2-diaminobenzene;
- Mixtures and derivatives thereof.

Examples of suitable aliphatic diamines include
- hexamethylene diamine,
- dodecane diamine,
- cyclohexane diamine;
- and mixtures thereof.

In one embodiment, the chemically converted polyimide is derived from pyromellitic dianhydride ("PMDA") and 4,4'-oxydianiline ("4,4 ODA"). In one embodiment, the polyimides of the present disclosure are copolyimides derived from any of the above diamines and dianhydrides. In one embodiment, the copolyimide is derived from 15 to 85 mole % of biphenyltetracarboxylic dianhydride, 15 to 85 mole % pyromellitic dianhydride, 30 to 100 mole % p-phenylenediamine and optionally including 0 to 70 mole % of 4,4'-diaminodiphenyl ether and/or 4,4'-diaminodiphenyl ether. Such copolyimides are further described in U.S. Pat. Nos. 4,778,872 and 5,166,308.

In one embodiment, the polyimide dianhydride component is pyromellitic dianhydride ("PMDA") and the polyimide diamine component is a combination of 4,4'-oxydianiline ("4,4 ODA") and p-phenylenediamine ("PPD"). In one embodiment the polyimide dianhydride component is pyromellitic dianhydride ("PMDA") and the polyimide diamine component is a combination of 4,4'-oxydianiline ("4,4 ODA") and p-phenylenediamine ("PPD"), where the ratio of ODA to PPD (ODA:PPD) is any of the following mole ratios: i. 20-80:80-20; ii. 50-70:50-30; or iii. 55-65:45-35. In one embodiment the polyimide dianhydride component is PMDA, and the diamine component is a mole ratio of ODA to PPD (ODA:PPD) of about 60:40.

In one embodiment, the polyimide dianhydride component is 3,3',4,4'-biphenyltetracarboxylic dianhydride ("BPDA") and the polyimide diamine component is a combination of 4,4'-oxydianiline ("4,4 ODA") and p-phenylenediamine ("PPD"). In one embodiment the polyimide dianhydride component is BPDA and the polyimide diamine component is a combination of 4,4 ODA and PPD, where the ratio of ODA to PPD (ODA:PPD) is any of the following mole ratios: i. 20-80:80-20; ii. 50-70:50-30; or iii. 55-65:45-35. In one embodiment the polyimide dianhydride component is BPDA, and the diamine component is a mole ratio of ODA to PPD (ODA:PPD) of about 60:40.

In one embodiment, the polyamic acid solvent must dissolve one or both of the polymerizing reactants and in one embodiment, will dissolve the polyamic acid polymerization product. The solvent should be substantially unreactive with all of the polymerizing reactants and with the polyamic acid polymerization product.

In one embodiment the polyamic acid solvent is a liquid N,N-dialkylcarboxylamide, such as, a lower molecular weight carboxylamide, particularly N,N-dimethylformamide and N,N-diethylacetamide. Other useful compounds of this class of solvents are N,N-diethylformamide and N,N-diethylacetamide. Other solvents which may be used are sulfolane, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid.

The polyamic acid solutions are generally made by dissolving the diamine in a dry solvent and slowly adding the dianhydride under conditions of agitation and controlled temperature in an inert atmosphere.

In some embodiments, the base film comprises a chemically converted polyimide in an amount between and optionally including any two of the following: 63, 65, 70, 75, 80, 85, 90, 95 and 96 weight percent of the base film.

Pigment

Virtually any pigment (or combination of pigments) can be used in the performance of the present invention. In some embodiments, useful pigments include but are not limited to the following: Barium Lemon Yellow, Cadmium Yellow Lemon, Cadmium Yellow Lemon, Cadmium Yellow Light, Cadmium Yellow Middle, Cadmium Yellow Orange, Scarlet Lake, Cadmium Red, Cadmium Vermilion, Alizarin Crimson, Permanent Magenta, Van Dyke brown, Raw Umber Greenish, or Burnt Umber. In some embodiments, useful black pigments include: cobalt oxide, Fe—Mn—Bi black, Fe—Mn oxide spinel black, (Fe,Mn)2O3 black, copper chromite black spinel, lampblack, bone black, bone ash, bone char, hematite, black iron oxide, micaceous iron oxide, black complex inorganic color pigments (CICP), (Ni,Mn,Co)(Cr,Fe)2O4 black, Aniline black, Perylene black, Anthraquinone black, Chromium Green-Black Hematite, Chrome Iron Oxide, Pigment Green 17, Pigment Black 26, Pigment Black 27, Pigment Black 28, Pigment Brown 29, Pigment Brown 35, Pigment Black 30, Pigment Black 32, Pigment Black 33 or mixtures thereof.

In some embodiments, the pigment is lithopone, zinc sulfide, barium sulfate, cobalt oxide, yellow iron oxide, orange iron oxide, red iron oxide, brown iron oxide, hematite, black iron oxide, micaceous iron oxide, chromium (III) green, ultramarine blue, ultramarine violet, ultramarine pink, cyanide iron blue, cadmium pigments or lead chromate pigments.

In some embodiments, the pigment is complex inorganic color pigments (CICP) such as spinel pigments, rutile pigments, zircon pigments or bismuth vanadate yellow. In some embodiments, useful spinel pigments include but are not limited to: Zn(Fe,Cr)2O4 brown, CoAl2O4 blue, Co(AlCr)2O4 blue-green, Co2TiO4 green, CuCr2O4 black or (Ni,Mn,Co)(Cr,Fe) 2O4 black. In some embodiments, useful rutile pigments include but are not limited to: Ti—Ni—Sb yellow, Ti—Mn—Sb brown, Ti—Cr—Sb buff, zircon pigments or bismuth vanadate yellow.

In another embodiment, the pigment is an organic pigment. In some embodiments, useful organic pigments include but are not limited to: Aniline black (Pigment Black 1), Anthraquinone black, Monoazo type, Diazo type, Benzimidazolones, Diarylide yellow, Monoazo yellow salts, Dinitaniline orange, Pyrazolone orange, Azo red, Naphthol red, Azo condensation pigments, Lake pigments, Copper Phthalocyanine blue, Copper Phthalocyanine green, Quinacridones, Diaryl Pyrrolopyrroles, Aminoanthraquinone pigments, Dioxazines, Isoindolinones, Isoindolines, Quinophthalones, phthalocyanine pigments, idanthrone pigments, pigment violet 1, pigment violet 3, pigment violet 19 or pigment violet 23. In yet another embodiment, the organic pigment is a Vat dye pigment, such as but not limited to: perylene, perylene black, perinones or thioindigo.

A uniform dispersion of isolated, individual pigment particles (aggregates) not only decreases the electrical conductivity, but additionally tends to produce uniform color intensity. In some embodiments the pigment is milled. In some embodiments, the mean particle size of the pigment is between (and optionally including) any two of the following sizes: 0.2, 0.3, 0.4, 0.5, 0.6, 0.7, 0.8, 0.9 and 1.0 microns. The thickness of the base film can be tailored to the specific application.

In some embodiments, a pigment, other than carbon black, is present in an amount between and optionally including any two of the following: 2, 5, 10, 15, 20, 25, 30 and 35 weight percent of the base film. In some embodiments, a dye is used in place of a pigment. In some embodiments, a dye is present in an amount between and optionally including any two of the following: 2, 5, 10, 15, 20, 25, 30 and 35 weight percent of the base film. In some embodiments, a mixture of dye and pigment may be used. In some embodiments, luminescent (fluorescent or phosphorescent), or pearlescent pigments can be used, alone, or in combination with other pigments or dyes.

Matting Agent

Polymeric materials typically have inherent surface gloss. To control gloss (and thereby produce matte surface characteristics) various additive approaches are possible to achieve dull and low gloss surface characteristics. Broadly speaking, the additive approaches are all based upon the same fundamental physics—to create a modified surface which is (on a micro-scale) coarse and irregular shaped and therefore allows less light to be reflected back to the distant (e.g., greater than 50 centimeters) observer. When multiple rays of light hit a glossy surface, most of the light is reflected with similar angle and therefore a relatively high level of light reflectance can be observed. When the same source of light hits a matte (ie. irregular) surface, the light is scattered in many different directions and also a much higher fraction is absorbed. Hence on rough surfaces, light tends to be diffusely scattered in all directions, and the image forming qualities are largely diminished (reflected objects no longer appear brilliant, but blurred).

Gloss meters used to characterize a specific surface for gloss level are based on this same principle. Typically, a light source hits a surface at a fixed angle and after reflection the amount of reflected light is read by a photo cell. Reflection can be read at multiple angles. Maximum gloss performance for a perfectly glossy surface tends to demonstrate 100% reflection, whereas a fully dull surface tends to demonstrate 0% reflection.

Silicas are inorganic particles that can be ground and filtered to specific particle size ranges. The very irregular shape and porosity of silica particles and low cost make it a popular matting agent. Other potential matting agents can include: i. other ceramics, such as, borides, nitrides, carbides and other oxides (e.g., alumina, titania, etc); and ii. organic particles, provided the organic particle can withstand the temperature processing of a chemically converted polyimide (processing temperatures of from about 250° C. to about 550° C., depending upon the particular polyimide process chosen). On matting agent that can be useful in polyimide applications (can withstand the thermal conditions of polyimide synthesis) are polyimide particles.

The amount of matting agent, median particle size and density must be sufficient to produce the desired 60 degree gloss value. In some embodiments, the base film 60 degree gloss value is between and optionally including any two of the following: 2, 5, 10, 15, 20, 25, 30 and 35. In some embodiments, the base film 60 degree gloss value is from 10 to 35.

In some embodiments, the matting agent is present in an amount between and optionally including any two of the following: 1.6, 2, 3, 4, 5, 6, 7, 8, 9 and 10 weight percent of base film. In some embodiments, the matting agent has a median particle size between and optionally including any two of the following: 1.3, 2, 3, 4, 5, 6, 7, 8, 9 and 10 microns. The matting agent particles should have an average particle size of less than (or equal to) about 10 microns and greater than (or equal to) about 1.3 microns. Larger matting agent particles may negatively impact mechanical properties of the final base film. In some embodiments, the matting agent has a density between and optionally including any two of the following: 2, 3, 4 and 4.5 g/cc. In some embodiments, when the amount of matting agent is below 1.6 weight percent of base film, the desired 60 degree gloss value is not achieved even when the matting agent median particle size and density are in the desired ranges. In some embodiments, when the median particle size is below 1.3 microns, the desired 60 degree gloss value is not achieved even when the amount of matting agent and density are in the desired ranges. In some embodiments, the matting agent is selected from the group consisting of silica, alumina, barium sulfate and mixtures thereof.

The base film can be prepared by any method well known in the art for making a chemically converted, filled polyimide layer. In one such embodiment, a slurry comprising pigment (or dye) is prepared and a matting agent slurry is prepared. The slurries may or may not be milled using a ball mill to reach the desired particle size. The slurries may or may not be filtered to remove any residual large particles. A polyamic acid solution can be made by methods well known in the art. The polyamic acid solution may or may not be filtered. In some embodiments, the solution is mixed in a high shear mixer with the pigment slurry and the matting agent slurry. When a polyamic acid solution is made with a slight excess of diamine, additional dianhydride solution may or may not be added to increase the viscosity of the mixture to the desired level for film casting. The amount of the polyamic acid solution, pigment slurry (or dye slurry), and matting agent slurry can be adjusted to achieve the desired loading levels in the cured base film. In some embodiments the mixture is cooled below 0° C. and mixed with conversion chemicals prior to casting onto a heated rotating drum or belt in order to produce a partially imidized gel film. The gel film may be stripped from the drum or belt, placed on a tenter frame, and cured in an oven, using convective and radiant heat to remove solvent and complete the imizidation to greater than 98% solids level.

Adhesive

In some embodiments, the base film is a multilayer film comprising the base film and an adhesive layer. The base film of the present disclosure can comprise an adhesive layer for maintaining the base film in place, once applied. In one embodiment, the adhesive consists of an epoxy resin and hardener, and, optionally, further contains additional components, such as, an elastomer, curing accelerator(catalyst), hardener, filler and flame retardant.

In some embodiments, the adhesive is an epoxy resin. In some embodiments, the epoxy resin is selected from the group consisting of:
 Bisphenol F type epoxy resin,
 Bisphenol S type epoxy resin,
 Phenol novolac type epoxy resin,
 Biphenyl type epoxy resin,
 Biphenyl aralkyl type epoxy resin,
 Aralkyl type epoxy resin,
 Dicyclopetadiene type epoxy resin,
 Multifunctional type epoxy resin,
 Naphthalene type epoxy resin,
 Rubber modified epoxy resin, and
 mixtures thereof.

In another embodiment, the adhesive is an epoxy resin selected from the group consisting of bisphenol A type epoxy resin, cresol novolac type epoxy resin, phosphorus containing epoxy resin, and mixtures thereof. In some embodiments, the adhesive is a mixture of two or more epoxy resins. In some embodiments, the adhesive is a mixture of the same epoxy resin having different molecular weights.

In some embodiments, the epoxy adhesive contains a hardener. In one embodiment, the hardener is a phenolic compound. In some embodiments, the phenolic compound is selected from the group consisting of:
 Novolac type phenol resin,
 Aralkyl type phenol resin,
 Biphenyl aralkyl type phenol resin,
 Multifunctional type phenol resin,
 Nitrogen containing phenol resin,
 Dicyclopetadiene type phenol resin,
 Phosphorus containing phenol resin, and
 Triazine containing phenol novolac resin.

In another embodiment, the hardener is an aromatic diamine compound. In some embodiments, the aromatic diamine compound is a diaminobiphenyl compound. In some embodiments, the diaminobiphenyl compound is 4,4'-diaminobiphenyl or 4,4'-diamino-2,2'-dimethylbiphenyl. In some embodiments, the aromatic diamine compound is a diaminodiphenylalkane compound. In some embodiments, the diaminodiphenylalkane compound is 4,4'-diaminodiphenylmethane or 4,4'-diaminodiphenylethane. In some embodiments, the aromatic diamine compound is a diaminodiphenyl ether compound. In some embodiments, the diaminodiphenyl ether compounds is 4,4'-diaminodiphenylether or di(4-amino-3-ethylphenyl)ether. In some embodiments, the aromatic diamine compound is a diaminodiphenyl thioether compound. In some embodiments, the diaminodiphenyl thioether compound is 4,4'-diaminodiphenyl thioether or di(4-amino-3-propylphenyl)thioether. In some embodiments, the aromatic diamine compound is a diaminodiphenyl sulfone compound. In some embodiments, the diaminodiphenyl sulfone compound is 4,4'-diaminodiphenyl sulfone or di(4-amino-3-isopropylphenyl)sulfone. In some embodiments, the aromatic diamine compound is phenylenediamine. In one embodiment, the hardener is an amine compound. In some embodiments, the amine compound is a guanidine. In some embodiments, the guanidine is dicyandiamide (DICY). In another embodiment, the amine compound is an aliphatic diamine. In some embodiments, the aliphatic diamine is ethylenediamine or diethylenediamine.

In some embodiments, the epoxy adhesive contains a catalyst. In some embodiments, the catalyst is selected from the group consisting of imidazole type, triazine type, 2-ethyl-4-methyl-imidazole, triazine containing phenol novolac type and mixtures thereof.

In some embodiments, the epoxy adhesive contains a elastomer toughening agent. In some embodiments, the elastic toughening agent is selected from the croup consisting of ethylene-acryl rubber, acrylonitrile-butadiene rubber, carboxy terminated acrylonitrile-butadiene rubber and mixtures thereof.

In some embodiments, the epoxy adhesive contains a flame retardant. In some embodiments, the flame retardant is selected from the group consisting of aluminum trihydroxide, melamine polyphosphate, condensed polyphosphate ester, other phosphorus containing flame retardants and mixtures thereof.

In some embodiments, the adhesive layer is selected from the group consisting of:
 polyimide,
 butyral phenolic,
 polysiloxane,
 polyimidesiloxane,
 fluorinated ethylene propylene copolymers,
 perfluoroalkoxy copolymers,
 ethylene vinyl acetate copolymers,
 ethylene vinyl acetate glycidyl acrylate terpolymer,
 ethylene vinyl acetate glycidyl methacrylate terpolymer,
 ethylene alkyl acrylate copolymers with adhesion promotor, ethylene alkyl methacrylate copolymers with adhesion promotor,
ethylene glycidyl acrylate,
ethylene glycidyl methacrylate,
ethylene alkyl acrylate glycidyl acrylate terpolymer,
ethylene alkyl methacrylate glycidyl acrylate terpolymer,
ethylene alkyl acrylate maleic anhydride terpolymers,
ethylene alkyl methacrylate maleic anhydride terpolymers,
ethylene alkyl acrylate glycidyl methacrylate terpolymers,
ethylene alkyl methacrylate glycidyl methacrylate terpolymers,
alkyl acrylate acrylonitrile acrylic acid terpolymers,
alkyl acrylate acrylonitrile methacrylic acid terpolymers,
ethylene acrylic acid copolymer including salts thereof,
ethylene methacrylic acid copolymer including salts thereof,
alkyl acrylate acrylonitrile glycidyl methacrylate terpolymers,
alkyl methacrylate acrylonitrile glycidyl methacrylate terpolymers,
alkyl acrylate acrylonitrile glycidyl acrylate terpolymers,
alkyl methacrylate acrylonitrile glycidyl acrylate terpolymers,
polyvinyl butyral,
ethylene alkyl acrylate methacrylic acid terpolymers and salts thereof,
ethylene alkyl methacrylate methacrylic acid terpolymers and salts thereof,
ethylene alkyl acrylate acrylic acid terpolymers and salts thereof
ethylene alkyl methacrylate acrylic acid terpolymers and salts thereof,
ethylene ethyl hydrogen maleate,
ethylene alkyl acrylate ethyl hydrogen maleate,
ethylene alkyl methacrylate ethyl hydrogen maleate,
and mixtures thereof.

In some embodiments, the multilayer film is a coverlay film.

In the following examples all parts and percentages are by weight unless otherwise indicated.

EXAMPLES

The invention will be further described in the following examples, which is not intended to limit the scope of the invention described in the claims.

Optical density was measured with a Macbeth TD904 optical densitometer. The average of 5-10 individual measurements was recorded.

60 degree gloss value was measured with a Micro-TRI-Gloss gloss meter, Gardner USA, Columbia, Md. The average of 5-10 individual measurements was recorded.

Surface resistivity was measured using a Advantest Model R8340 ultra high resistance meter with a UR type concentric ring probe and was measured at 1000 volts. The average of 3-5 individual measurements was recorded.

Dielectric strength was measured using a Beckman Industrial AC Dielectric Breakdown Tester, according to ASTM D149. The average of 5-10 individual measurements was recorded.

Median particle size was measured using a Horiba LA-930 particle size analyzer. Horiba, Instruments, Inc., Irvine Calif. DMAC (dimethylacetamide) was used as the carrier fluid.

When a continuous film casting process was used to produce samples, an ashing process was used to confirm the amount of matting agent in the film. The film was ashed by heating in a furnace at 900° C. to burn off all of the polymer and pigment, leaving only a white matting agent residue. Comparing weights before and after ashing shows the amount of matting agent the film contains.

Polyamic acid viscosity measurements were made on a Brookfield Programmable DV-II+ viscometer using either an RV/HA/HB #7 spindle or an LV #5 spindle. The viscometer speed was varied from 5 to 100 rpm to provide an acceptable percent torque value. Readings were temperature corrected to 25° C.

Example 1

Example 1 demonstrates that chemical conversion using a ultramarine blue pigment achieves low 60 degree gloss value (matte appearance) on both sides of base film and a significant increase in optical density.

A silica slurry was prepared, consisting of 75.4 wt % DMAC, 9.6 wt % PMDA/4,4'ODA polyamic acid prepolymer solution (20.6 wt % polyamic acid solids in DMAC) and 15.0 wt % silica powder (Syloid® C 803, from W. R. Grace Co.). The ingredients were thoroughly mixed in a high shear rotor-stator type mixer. Median particle size was 3.3-3.6 microns.

A blue pigment slurry was prepared by first dispersing 7.5 grams of ultramarine blue pigment (Nubicoat HWR, from Nubiola) in 38.9 grams of DMAC, and processing for 10 minutes with an ultrasonic processor (Sonics & Materials, Inc., Model VCX-500) in order to deagglomerate the pigment. The dispersion was then mixed with 3.6 grams of a PMDA/4,4'ODA polyamic acid prepolymer solution (20.6 wt % polyamic acid solids in DMAC).

A PMDA/4,4'ODA prepolymer solution (20.6 wt % polyamic acid solids in DMAC) was finished by incrementally adding, with mixing, a 6 wt % solution of PMDA in DMAC, to achieve a final viscosity of about 3000 Poise. To 157.3 grams of the finished polyamic acid solution was added, with thorough mixing, 6.1 grams of silica slurry and 36.6 grams of blue pigment slurry. The finished polymer mixture was degassed. Using a stainless steel casting rod, the polymer mixture was manually cast onto a Mylar® polyethylene terephthalate sheet attached to a glass plate. The Mylar® polyethylene terephthalate sheet containing the wet cast film was immersed in a bath consisting of a 50/50 mixture of 3-picoline and acetic anhydride. The bath was gently agitated for a period of 3 to 4 minutes in order to effect imidization and gellation of the film. The gel film was peeled from the Mylar® polyethylene terephthalate sheet and placed on a pin frame to restrain the film and prevent shrinking. After allowing for residual solvent to drain from the film, the pin frame containing the film was placed in a 120° C. oven. The oven temperature was ramped to 320° C. over a period of 60 to 75 minutes, held at 320° C. for 10 minutes, then transferred to a 400° C. oven and held for 5 minutes, then removed from the oven and allowed to cool. Based on the composition of the finished polymer mixture, the base film contained 2.5 wt % silica and 15 wt % pigment.

Results are shown in Table 1.

Comparative Example 1

Comparative Example 1 demonstrates thermal conversion with the same amount of matting agent as in example 19, produces a high (undesirable) 60 degree gloss value on both sides of base film.

The degassed finished polymer mixture from the Example 19 was manually cast onto a glass plate, using a stainless steel casting rod. The glass plate containing the wet cast film was placed on a hot plate at 80-100° C. for 30-45 minutes to form a partially dried, partially imidized "green" film. The green film was peeled from the glass and placed on a pin frame. The pin frame containing the green film was placed in a 120° C. oven. The oven temperature was ramped to 320° C. over a period of 60 to 75 minutes, held at 320° C. for 10 minutes, then transferred to a 400° C. oven and held for 5 minutes, then removed from the oven and allowed to cool.

Results are shown in Table 1.

TABLE 1

| | Conv. | wt % ultramarine blue | wt % matting agent | matting agent D50 (microns) | matting agent Density g/cc | Air side 60 degree gloss | other side 60 degree gloss | Dielectric strength (V/mil) | Thickness (mils) | Thickness (microns) | O.D. |
|---|---|---|---|---|---|---|---|---|---|---|---|
| 1 | chemical | 15 wt % ultramarine blue | 2.5% silica | 3.3-3.6 | 2.1 | 4.1 | 4.9 | 3792 | 1.95 | 49.5 | 2.7 |
| c1 | thermal | 15 wt % ultramarine blue | 2.5% silica | 3.3-3.6 | 2.1 | 55.2 | 56 | 3423 | 2.1 | 53.3 | 1.96 |

Note that not all of the activities described above in the general description or the examples are required, that a portion of a specific activity may not be required, and that further activities may be performed in addition to those described. Still further, the order in which each of the activities are listed are not necessarily the order in which they must be performed. After reading this specification, the ordinary artisan will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification and figures are to be regarded in an illustrative rather than a restrictive sense and all such modifications are intended to be included within the scope of the invention.

What is claimed is:

1. A base film comprising:
   A. a chemically converted polyimide in an amount from 63 to 96 weight percent of the base film, the chemically converted polyimide being derived from:
      a. at least 50 mole percent of an aromatic dianhydride, based upon a total dianhydride content of the polyimide, and
      b. at least 50 mole percent of an aromatic diamine based upon a total diamine content of the polyimide;
   B. a pigment, other than carbon black, present in an amount from 2 to 35 weight percent of the base film; and
   C. a particulate matting agent that:
      a. is silica and is present in an amount from 1.6 to 10 weight percent of the base film,
      b. has a median particle size from 1.3 to 10 microns,
      c. has a density from 2 to 4.5 g/cc,
   and the base film has a 60 degree gloss from 2 to 35.

2. The base film in accordance with claim 1 wherein:
   a. the aromatic dianhydride is selected from the group consisting of:
   pyromellitic dianhydride,
   3,3',4,4'-biphenyl tetracarboxylic dianhydride,
   3,3',4,4'-benzophenone tetracarboxylic dianhydride,
   4,4'-oxydiphthalic anhydride,
   3,3',4,4'-diphenyl sulfone tetracarboxylic dianhydride,
   2,2-bis(3,4-dicarboxyphenyl) hexafluoropropane,
   bisphenol A dianhydride, and mixtures thereof; and
   b. the aromatic diamine is selected from the group consisting of:
   3,4'-oxydianiline,
   1,3-bis-(4-aminophenoxy) benzene,
   4,4'-oxydianiline,
   1,4-diaminobenzene,
   1,3-diaminobenzene,
   2,2'-bis(trifluoromethyl) benzidene,
   4,4'-diaminobiphenyl,
   4,4'-diaminodiphenyl sulfide,
   9,9'-bis(4-amino)fluorine and mixtures thereof.

3. The base film in accordance with claim 1 wherein the chemically converted polyimide is derived from pyromellitic dianhydride and 4,4'-oxydianiline.

4. A multilayer film comprising the base film of claim 1 and an adhesive layer.

5. The multilayer film in accordance with claim 4, wherein the adhesive layer is an epoxy resin selected from the group consisting of:
bisphenol A epoxy resin, cresol novolac epoxy resin, phosphorus containing epoxy resin, and mixtures thereof.

6. The multilayer film in accordance with claim 4, wherein the multilayer film is a coverlay film.

7. The base film in accordance with claim 1, wherein the base film has a thickness from 8 to 152 microns.

8. The base film in accordance with claim 1, wherein the chemically converted polyimide is created by a chemical conversion process that includes the use of a tertiary amine.

9. The base film in accordance with claim 8, wherein the tertiary amine used in the chemical conversion process is pyridine.

10. The base film in accordance with claim 8, wherein the tertiary amine used in the chemical conversion process is beta-picoline.

11. The base film in accordance with claim 1, wherein the chemically converted polyimide is created by a chemical conversion process that includes the use of an anhydride dehydrating material.

12. The base film in accordance with claim 11, wherein the anhydride dehydrating material used in the chemical conversion process is acetic anhydride.

13. The base film in accordance with claim 1, wherein the base film has a 60 degree gloss from 10 to 35.

14. The base film in accordance with claim 1, wherein the base film has an optical density greater than or equal to 2.

15. The base film in accordance with claim 1, wherein the base film has a dielectric strength greater than 1400 V/mil.

16. The base film in accordance with claim 1, wherein the pigment is present in an amount from 15 to 35 weight percent of the polyimide film.

17. A base film comprising:
   A. a chemically converted polyimide in an amount from 63 to 96 weight percent of the base film, the chemically converted polyimide being derived from:
      a. at least 50 mole percent of an aromatic dianhydride, based upon a total dianhydride content of the polyimide, and
      b. at least 50 mole percent of an aromatic diamine based upon a total diamine content of the polyimide;
   B. a dye present in an amount from 2 to 35 weight percent of the base film; and
   C. a particulate matting agent, providing the base film with a 60 degree gloss from 2 to 35, that:
      a. is silica and is present in an amount from 1.6 to 10 weight percent of the base film,
      b. has a median particle size from 1.3 to 10 microns, and
      c. has a density from 2 to 4.5 g/cc.

18. The base film in accordance with claim 17, wherein the dye is present in an amount from 15 to 35 weight percent of the polyimide film.

\* \* \* \* \*